(12) United States Patent
Lau

(10) Patent No.: US 12,468,840 B2
(45) Date of Patent: Nov. 11, 2025

(54) SYSTEMS AND METHODS FOR ENFORCING POLICIES ON ELECTRONIC HEALTH RECORD REQUESTS

(71) Applicant: Change Healthcare Holdings, LLC, Nashville, TN (US)

(72) Inventor: Yee Lau, Carol Stream, IL (US)

(73) Assignee: Change Healthcare Holdings, LLC, Nashville, TN (US)

( * ) Notice: Subject to any disclaimer, the term of this patent is extended or adjusted under 35 U.S.C. 154(b) by 138 days.

(21) Appl. No.: 18/055,976

(22) Filed: Nov. 16, 2022

(65) Prior Publication Data
US 2024/0160775 A1    May 16, 2024

(51) Int. Cl.
*G06F 21/62*    (2013.01)
*G16H 10/60*    (2018.01)

(52) U.S. Cl.
CPC ......... *G06F 21/6245* (2013.01); *G16H 10/60* (2018.01)

(58) Field of Classification Search
CPC ............................ G06F 21/6245; G16H 10/60
See application file for complete search history.

(56) References Cited

U.S. PATENT DOCUMENTS

| | | | | |
|---|---|---|---|---|
| 2014/0324480 | A1* | 10/2014 | Dufel | G16H 10/60 705/3 |
| 2015/0058627 | A1* | 2/2015 | Paffel | G16H 10/60 713/168 |
| 2017/0255790 | A1* | 9/2017 | Barrett | G06F 21/6245 |
| 2021/0056637 | A1* | 2/2021 | Downs | G16H 10/60 |
| 2022/0108790 | A1* | 4/2022 | Rice | G16H 10/20 |

\* cited by examiner

*Primary Examiner* — Hany S. Gadalla
(74) *Attorney, Agent, or Firm* — MARSHALL, GERSTEIN & BORUN LLP

(57) ABSTRACT

When a healthcare organization submits a request for EHRs on behalf of one or more patients, the policy engine may intercept the request and may determine whether the request complies with one or more policies. The policies may be created based on one or more state and Federal regulations and may relate to who is authorized to request EHRs for a particular patient and what information can be included in the EHRs. The policy engine may determine if the request complies with the policies, and if not, the policy engine may modify the request to comply with the policies and may hand off the modified request to the API.

15 Claims, 5 Drawing Sheets

US 12,468,840 B2

1

SYSTEMS AND METHODS FOR ENFORCING POLICIES ON ELECTRONIC HEALTH RECORD REQUESTS

BACKGROUND

Electronic health records (EHRs) are used to share health information of patients between healthcare organizations such as insurance companies and medical providers. It is important that EHRs are protected from unauthorized access.

One method for sharing EHRs between healthcare organizations is using an application programming interfaces ("API"). Typically, each healthcare organization exposes an API through which other healthcare organizations can request EHRs. EHRs are protected by a variety of Federal and state level policies that govern how EHRs may be shared. Ensuring that a particular API complies with these policies can be difficult.

SUMMARY

To solve these and other problems, a policy engine is inserted between EHR clients and the APIs. When a healthcare organization submits a request for EHRs on behalf of one or more patients, the policy engine may intercept the request and may determine whether the request complies with one or more policies. The one or more policies may be created based on one or more state and Federal regulations and may relate to who is authorized to request EHRs for a particular patient and what information can be included in the EHRs. In one embodiment, the policy engine may determine if the request complies with the one or more policies, and if not, the policy engine may modify the request to comply with the one or more policies and may hand off the modified request to the API. In another embodiment, after a request for an EHR is fulfilled, the policy engine may receive the results and may check whether the information in the results complies with the one or more policies. If not, the policy engine may redact or remove the non-compliant information from the results. The modified results may then be provided to the client that requested the EHRs.

The policy engine described herein has many advantages over the prior art. Because the policy engine sits between the clients and the API, and either applies policies to requests before they reach the API or applies policies to responses before they are provided to a requestor, a healthcare organization can ensure that they comply will all state and Federal laws and regulations regarding EHR without having to significantly modify or change the API or client that is used to access the API. Furthermore, as new Federal and state polices are created or changed, the policy engine can easily be update ensuring that healthcare organizations and their APIs are fully compliant.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a system and method for EHR policy compliance. Together with the description, the figures further serve to explain the principles of the system and method for EHR policy compliance described herein and thereby enable a person skilled in the pertinent art to make and use the system and method for EHR policy compliance.

Figure 3:
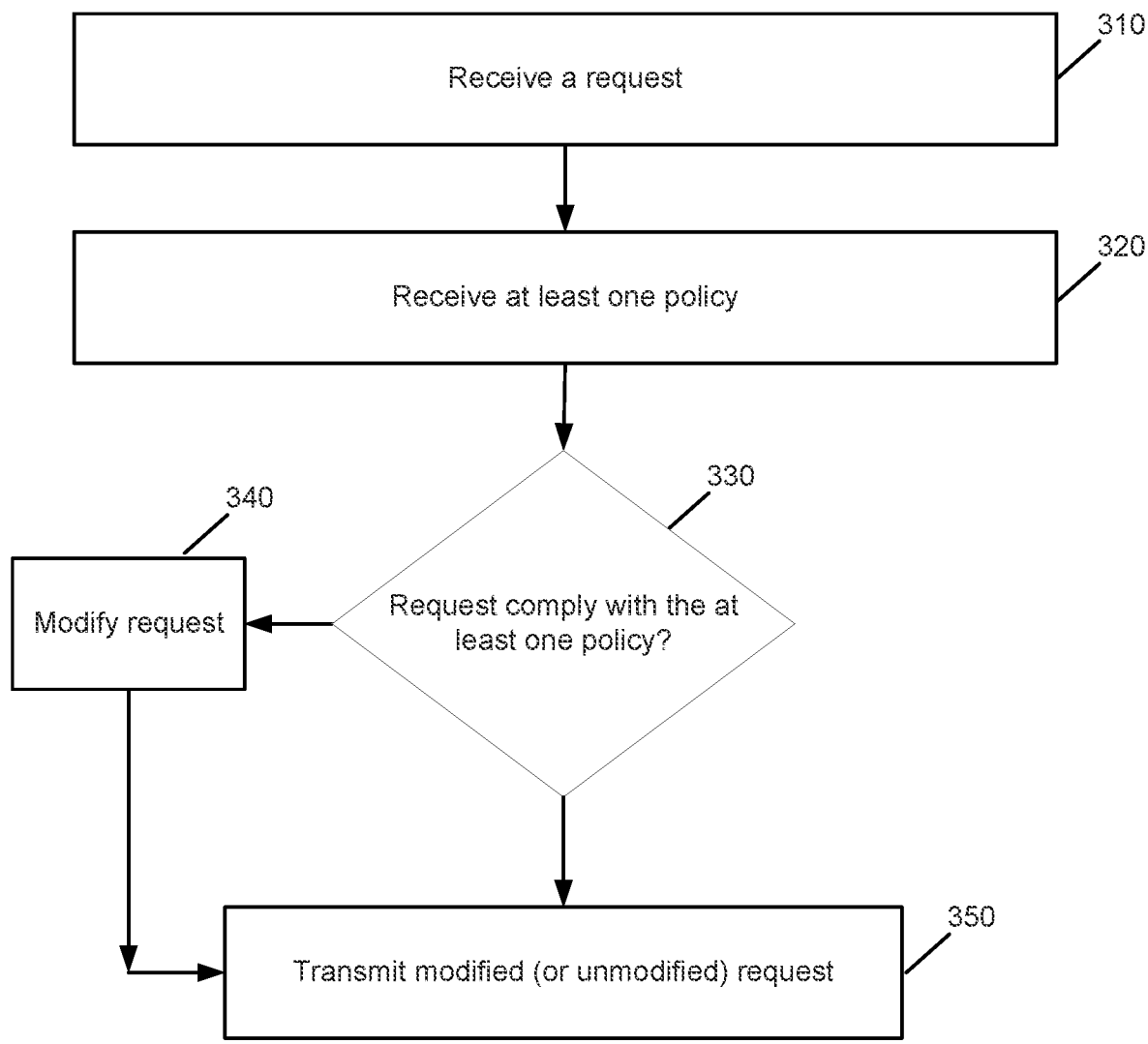
Figure 4:
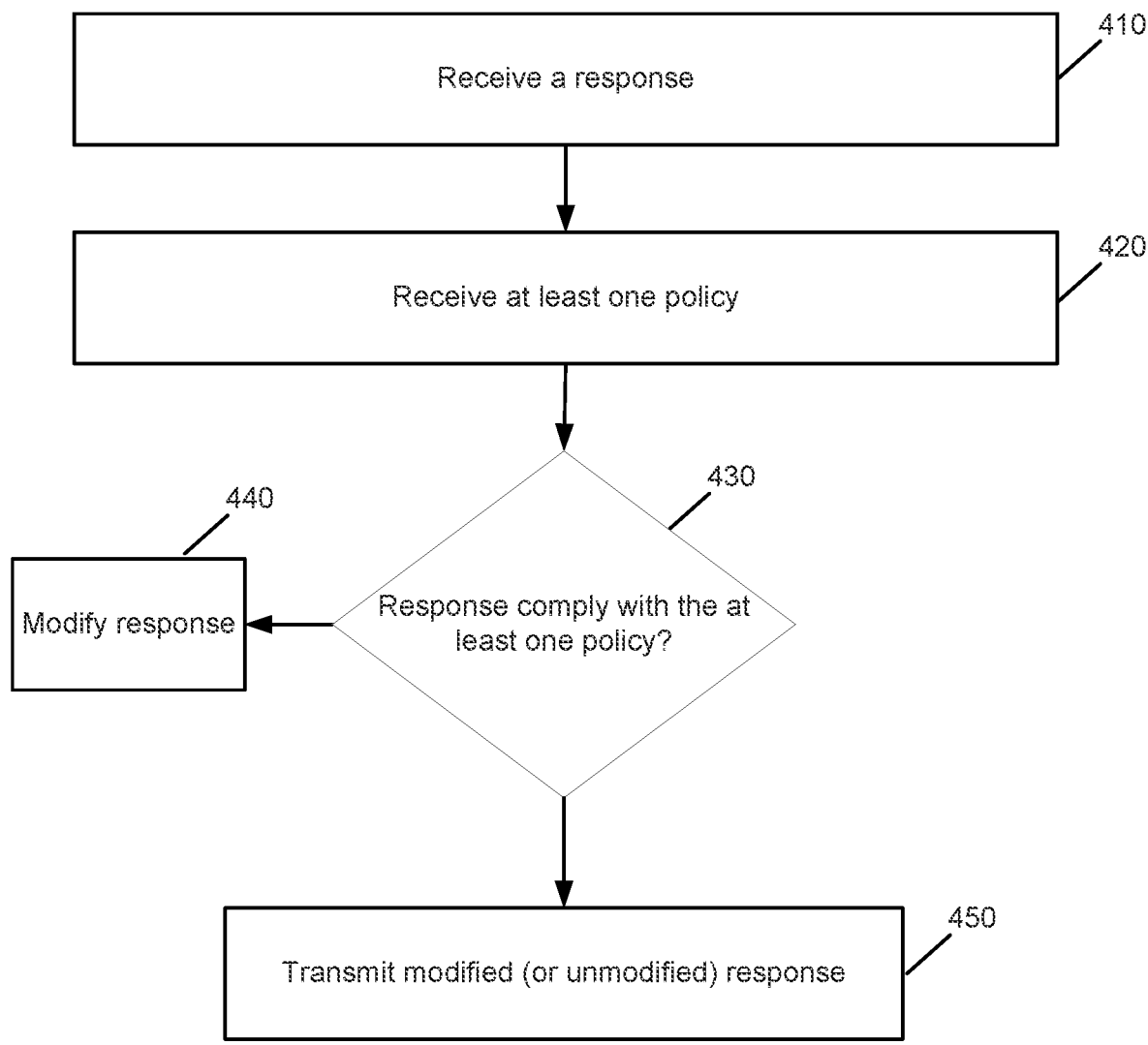
Figure 5:
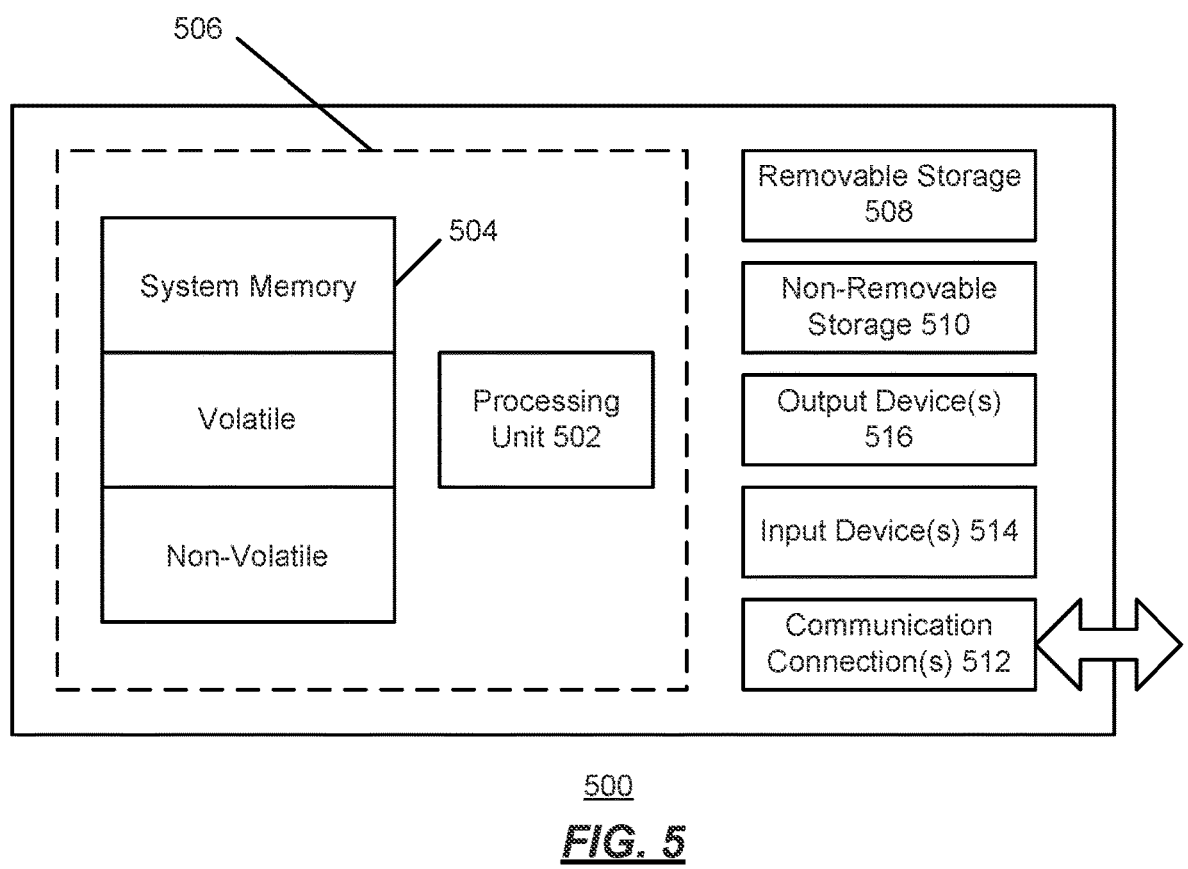

more policies;

FIG. 3 is an illustration of a method for modifying EHR requests based on or FIG. 4 is an illustration of a method for modifying EHR responses based on or more policies;

FIG. 5 shows an example computing environment in which example embodiments and aspects may be implemented.

DETAILED DESCRIPTION

Figure 1:
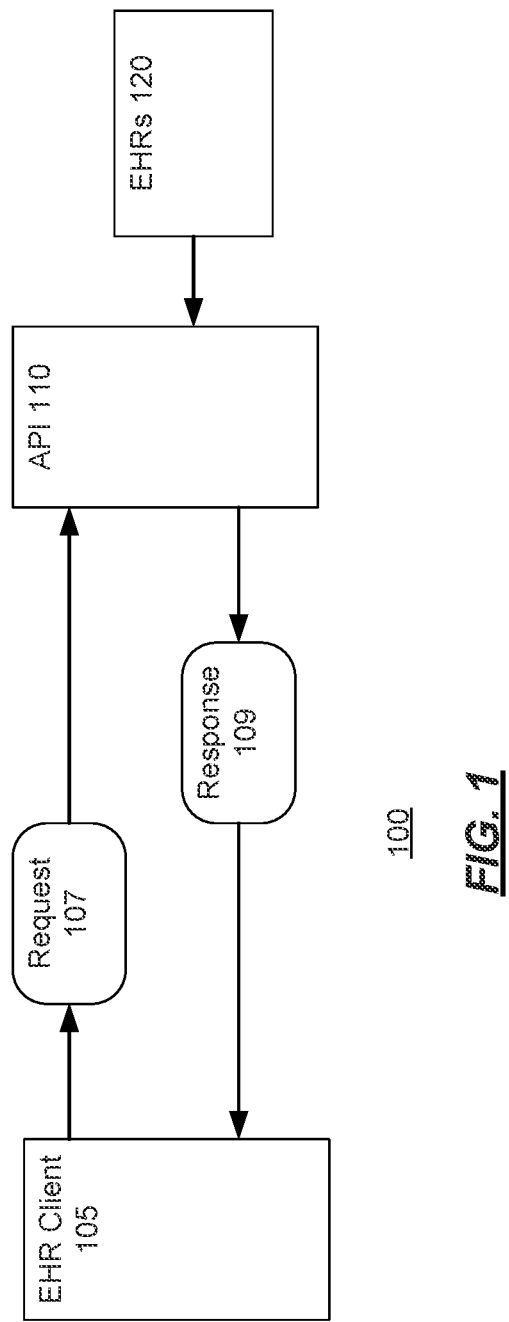
FIG. 1 is an example environment for providing and fulfilling EHR requests.

FIG. 1 is an example environment for receiving and fulfilling requests for electronic health records ("EHRs"). As shown, the environment 100 may include one or more of an EHR client 105 and an application programing interface ("API") 110 communicating through a network.

Each of the EHR client 105 may be associated with one or more healthcare organizations. As used herein a healthcare organization may include medical providers (e.g., doctors, hospitals, and clinics) as well as insurance providers (e.g., public or private insurance payors).

A user associated with a healthcare organization may use the EHR client 105 to generate a request 107 requesting one or more EHRs 120 under the control of another healthcare organization. The request 107 may be a JSON formatted request and may be provided by the EHR client 105 to a computing device ruing the API 110. The API 110 may be a JSON RESTful API 110. Other types of APIs may be supported.

The location of the API 110 may be associated with a uniform resource identifier ("URI") known to the EHR client 105. In some embodiments, the request 107 may include one or more authentication and authorization tokens that indicate to the API 110 that the operator of the EHR client 105 is authorized to request EHRs 120.

The API 110 may receive the request 107 and may format a response 109 that is responsive to the request 107. The response 109 may include data or information that is extracted from one or more of the EHRs 120. For example, a healthcare organization such as a hospital may generate a request 107 for dates and amounts of all insurance claims submitted to an insurance company by the hospital on behalf of a particular patient. The hospital may submit the request 107 to the API 110 associated with the insurance company. The API 110 may authenticate the request 107 using the tokens associated with the request 107, may identify the EHRs 120 associated with the patient, and may retrieve the requested dates and amounts from the EHRs 120. The API 110 may construct a response 109 from the retrieved data and may provide the response 109 to the EHR client 105.

As described above, the disclosure of EHRs 120 is subject to numerous state and Federal rules and regulations. Examples include rules about the types of information that require the permission of the patient or individual associated with the EHR 120, and rules about the types of information that can be disclosed for minors or other age groups and the types of permissions that are acceptable (e.g., permission of the parent or guardian, or the permission of the minor patient themselves).

Because of the numerous state and federal rules that apply to EHRs 120, it is difficult to ensure that requests 107 and responses 109 are compliant. For example, because of the numerous instances of the EHR clients 105 and APIs 110, it is a difficult task to keep each instance up-to-date with the newest changes to the laws. Moreover, each client 105 or API 110 may be located in a different state making it difficult to determine which laws apply to a particular request 107 or response 109.

Figure 2:
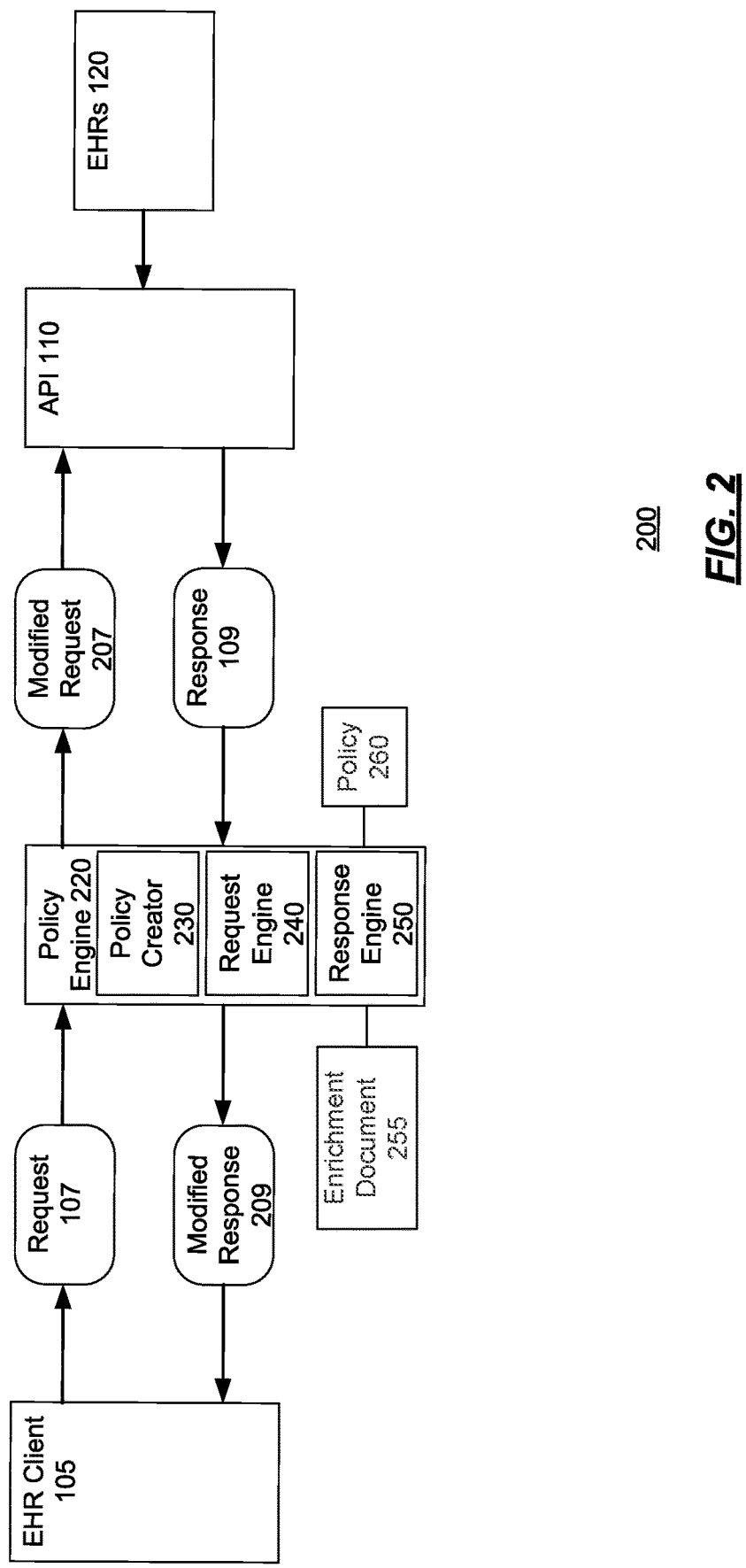
FIG. 2 is an example environment for providing and fulfilling EHR requests using a policy engine.

To solve these problems and others, FIG. 2 is an illustration of an environment 200 including a policy engine 220. The policy engine 220 may sit between the EHR client 105 and the API 110 and may ensure that the requests 107 and/or the responses 109 comply with all state and federal laws and guidelines.

As shown, the policy engine 220 may include several components including a policy creator 230, a request engine 240, and a response engine 250. More or fewer components may be supported. Each of the components may be implemented together or separately using one or more computing devices such as the computing device 500 illustrated with respect to FIG. 5.

The policy creator 230 may create one or more policies 260 that are used by the policy engine 220 to ensure that a request 107 or a response 109 complies with state and federal laws and regulations regarding EHRs 120. In some embodiments, each policy 260 may be code or a program that returns true if the request 107 and/or response 109 complies with the policy 260 and false otherwise. In addition, when a request 107 or a response 109 does not comply with a policy 260, the policy 260 may identify what aspects of the request 107 or response 109 are non-compliant.

The policy creator 230 may provide an interface through which creators or administrators may create policies 260 based on one or more laws or regulations associated with EHRs 120. Any method for creating a policy 260 based on a rule may be used.

The policy creator 230 may further create one or more enrichment documents 255. An enrichment document 255 as used herein is created for each patient or individual associated with an EHR 120 and may contain information about the various types of information that the patient has consented to being shared or released. These types of information may include the types of diagnoses that the patient is willing or unwilling to share, the prescribed medications that the patient is willing or unwilling to share, the types of received medical services that the patient is wiling to share, and the places or locations of where the medical services were performed that the patient is willing to share.

In some embodiments, each patient may be asked to provide consent with respect to each of the diagnoses, medication, services, and places of services found in the patient's EHRs 120. For example, the patient may be presented with a list of the diagnoses, medication, services, and places of services found in their EHRs 120. The patient may then select the items on the list that they consent to share. The patient may also indicate that they consent to the sharing of all information related to any of diagnoses, medication, services, and places of services. Other method for receiving consent from a patient may be used. The patient may revoke consent at any time. The consent information provided by each patient may be stored by the policy engine 220 in an enrichment document 255.

The request engine 240 may receive a request 107 from an EHR client 105. The request 107 may be a request for information from the EHRs 120. The request 107 may be intended for the API 110. The request 107 may be associated with at least one patient and may include a patient identifier.

In some embodiments, the request 107 may be intercepted by request engine 240 on its way to the API 110. Alternatively, a user or administrator may replace the URI of the API 110 used by the EHR client 105 with a URI of the policy engine 220, which results in the request 107 being sent to the policy engine 220 instead of the API 110.

Upon receiving the request, the request engine 240 may retrieve one or more policies 260 and may determine if the request 107 complies with the retrieved polices 260. If the request 107 complies with all of the retrieved one or more policies 260, the request engine 240 may provide the request 107 to the API 110 without modification.

In some embodiments, to determine if the request 107 complies with the one or more policies 260, the request engine 240 may use an enrichment document 255 associated with the patient identified in the request 107. Where multiple enrichment documents 255 are associated with the request 107, the request engine 240 may retrieve an enrichment document 255 for each patient.

For example, a request 107 may be received by the request engine 240 for a patient requesting information related to all of the claims made by the patient in the last 90 days. The patient may have a child who is 16 whose patient identifier is included in the request 107. The policy engine 220 may retrieve a policy 260 that allows a parent to consent to the release of EHRs 120 except for the mental health records of minors who are over 15. Because the enrichment document 255 for the child does not include a consent to release medical records related to mental health, the policy engine 220 may determine that the request 107 does not conform to the policy 260.

In response to the determination, the request engine 240 may reject the request 107 and may provide a message or indication to the EHR client 105 about why the request 107 was rejected. For example, the message may include an indicator of the policy that the request 107 was non-compliant with.

Alternatively, the request engine 240 may modify or change the request 107 so that the request 107 complies with all of the polices 260. Continuing the example above, the request engine 240 may modify the request 207 to exclude mental health related claims for the 16-year-old patient referenced in the request 107. The modified request 207 may then be provided by the request engine 240 to the API 110.

The API 110 may receive the modified request and may fulfil the modified request 207 from the EHR 120 and may generate a response 109. The API 110 may then send the response 109 to the EHR client 105. Depending on the embodiment, the response 109 may indicate that the original request 107 may have been modified due to non-compliance with one or more policies 260.

Rather than send the response 109 back to the EHR client 105, the API 110 may instead send the response 109 to the response engine 250. In some embodiments, the response 109 may be intercepted by the response engine 250 on its way to the EHR client 105. Alternatively, a user or administrator may replace the address or URI of the EHR client 105 in the response 109 or the modified response 209 with the URI of the response engine 250, which results in the response 109 being sent to the response engine 250 instead of the EHR client 105.

Upon receiving the response 109, the response engine 250 may similarly retrieve one or more policies 260 and enrichment documents 255 associated with the patients identified in the response 109. The response engine 250 may determine if the information in the response 109 complies with the retrieved polices 260 and enrichment documents 255. If the response 109 complies with all of the retrieved one or more policies 260, the response engine 240 may provide the response 109 to the EHR client 105 without modification.

Alternatively, the response engine 250 may modify or change the response 109 so that the response 109 complies with all of the polices 260. Depending on the embodiment, the response engine 240 may modify the response 109 to create the modified response 209 by removing or redacting the information that did not comply with a policy 260. The modified response 209 may then be provided by the response engine 250 to the EHR client 105.

Continuing the example above, the response 109 may include mental health related information pertaining to the 16-year-old child of the patient. Because the enrichment document 255 associated with the 16-year-old child does not include a consent to release the metal health information, the response 109 may not be compliant with the relevant policy 260. The request engine 240 may modify the request 207 to exclude mental health related claims for the 16-year-old patient referenced in the request 107.

Depending on the embodiment, the policy engine 220 may include both a requested engine 240 and a response engine 250, or may include either a request engine 240 or a response engine 250. As may be appreciated if the request engine 240 generates a modified request 207 that complies with the one or more policies 260, then there may be no need for a response engine 250 to also check the generated response 109 for compliance, and vice versa. However, including both a request engine 240 and a response engine 250 may offer better protection against policy violations because the response engine 250 can serve as a check against the request engine 240 to ensure that no policies 260 are violated by a modified response 209.

FIG. 3 is an illustration of a method 300 for modifying EHR requests 107 based on or more policies 260. The method 300 may be performed by the policy engine 220.

At 310, a request is received. The request 107 may be a JSON request and may be received by a policy engine 220 from an EHR client 105. The request 107 may be a request for information from one or more EHRs. The request 107 may be associated with a patient and a patient identifier. In some embodiments, the request 107 may be for medical claims associated with the patient.

At 320, at least one policy is retrieved. The at least one policy 260 may be retrieved by the request engine 240 from the policy creator 230. Each policy 260 may correspond to one or more state or federal regulations or rules regarding EHTs 120.

In addition to the at least one policy, in some embodiments, the request engine 240 may retrieve an enrichment document 255 for each patient referenced in the request 107. The enrichment document 255 for a patient may include indications of various types of EHRs 120 that the patient has consented to release.

At 330, whether the request 107 complies with the at least one policy is determined. The determination may be made by the request engine 240 and if available, the enrichment document 255. Depending on the embodiment, each policy 260 is a program that takes as an input the request 107 and the enrichment document 255 (if available) and outputs a Boolean value representing whether or not the request 107 complies with the policy. Where there are multiple policies 160, whether or not the request 107 complies with each policy 260 may be determined. If the request 107 complies with the at least one policy 260, the method 300 may continue at 350. Else, the method 300 may continue at 340.

At 340, the request is modified to comply with the at least one policy. The request 107 may be modified by the request engine 240 to create a modified request 207. In some embodiments, the request 107 may be modified by changing the query or expression of the request 107 so that it no longer requests information that is not permitted according to the at least one policy 160. Alternatively, rather than modify the request 107, the request engine 240 may deny the request 107 for being non-compliant with the at least one policy 260.

At 350, the modified (or unmodified) request is transmitted. The modified request 207 may be transmitted to the API 110 by the policy engine 220.

FIG. 4 is an illustration of a method 400 for modifying EHR responses 109 based on or more policies 260. The method 400 may be performed by the policy engine 220.

At 410, a response is received. The response 109 may be received by a policy engine 220 from an API 110. The response 109 may include information taken from one or more EHRs 120 and may have been generated in response to a received request 107. The information in the response 109 may be associated with one or more patients and may include one or more patient identifiers. The information in the response 109 may related to insurance claims made by one or more patients and may include information about medical procedures, diagnoses, and medications associated with one or more patients.

At 420, at least one policy is retrieved. The at least one policy 260 may be retrieved by the response engine 250 from the policy creator 230. Each policy 260 may correspond to one or more state or federal regulations or rules regarding EHTs 120.

In addition to the at least one policy, in some embodiments, the response engine 250 may retrieve an enrichment document 255 for each patient referenced in the response 109. The enrichment document 255 for a patient may include indications of various types of EHR 120 that the patient has consented to release.

At 430, whether the response 109 complies with the at least one policy is determined. The determination may be made by the response engine 250 and if available, the enrichment document 255. Where there are multiple policies 160, whether or not the response 109 complies with each policy may be determined. If the response 109 complies with the at least one policy 260, the method 400 may continue at 450. Else, the method 400 may continue at 440.

At 440, the response is modified to comply with the at least one policy. The response 109 may be modified by the response engine 250 to create a modified response 209. In some embodiments, the response 109 may be modified by removing or redacting any information that does not comply with the at least one policy. For example, the information may be replaced with "#" or other special characters to indicate to a viewer or user of the information that some of the information was removed.

At 450, the modified (or unmodified) response is transmitted. The modified response 209 may be transmitted to the EHR client 105 by the policy engine 220.

FIG. 5 shows an example computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an example system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method that allows a healthcare organization to comply with laws or regulations regarding electronic health records (EHRs) without significantly modifying an application programming interface associated with the EHRs or an EHR client that is used to access the application programming interface associated with the EHRs, the computer-implemented method comprising:

receiving, by one or more processors, an EHR request from the EHR client and for transmission to the application programming interface associated with the EHRs, wherein the EHR request references a first type of the EHRs and a second type of the EHRs, and wherein each of the EHRs associated with a patient;

retrieving, by the one or more processors, at least one policy that identifies the first type of the EHRs as non-compliant;

determining, by the one or more processors, that the EHR request does not comply with the at least one policy, wherein determining that the EHR request does not comply with the at least one policy comprises determining, by the one or more processors, that the patient has not consented to sharing of the EHRs;

in response to determining that the EHR request does not comply with the at least one policy, modifying, by the one or more processors, the EHR request to comply with the at least one policy to generate a modified EHR request that no longer references the first type of the EHRs;

transmitting, by the one or more processors, the modified EHR request to the application programming interface associated with the EHRs, wherein the application programming interface associated with the EHRs responds to EHR requests with a response including data or information extracted from the EHRs:

receiving, by the one or more processors, results from the application programming interface, wherein the results include first information taken from the EHRs;

determining, by the one or more processors, that at least one portion of the the information does not comply with the at least one policy; and in response to determining that the at least one portion of the first information does not comply with the at least one policy, modifying, by the one or more processors, the results to comply with the at least one policy.

2. The computer-implemented method of claim 1, wherein modifying the results comprises retracting the at least one portion of the first information from the results.

3. The computer-implemented method of claim 1, wherein modifying, by the one or more processors, the EHR request to comply with the at least one policy comprises removing second information associated with the patient from the EHR request.

4. The computer-implemented method of claim 1, wherein the at least one policy relates to an age of the patient.

5. The computer-implemented method of claim 1, wherein the EHR request is a JavaScript Object Notation (JSON) request.

6. The computer-implemented method of claim 1, wherein the at least one policy corresponds to one or more federal and state laws.

7. A system that allows a healthcare organization to comply with laws or regulations regarding electronic health records (EHRs) without significantly modifying an application programming interface associated with the EHRs or an EHR client that is used to access the application programming interface associated with the EHRs, the system comprising:

one or more processors; and one or more memories storing processor-executable instructions that, when executed by the one or more processors, cause the one or more processors to perform operations comprising:

receiving, from the EHR client and for transmission to the application programming interface associated with the EHRs, an EHR request that references a first type of the EHRs and a second type of the EHRs, wherein each of the EHRs are associated with a patient;

retrieving at least one policy that identifies the first type of the EHRs as non-compliant;

determining that the EHR request does not comply with the at least one policy, wherein determining that the EHR request does not comply with the at least one policy comprises determining that the patient has not consented to sharing of the EHRs;

in response to determining that the EHR request does not comply with the at least one policy, modifying the EHR request to comply with the at least one policy to generate a modified EHR request that no longer references the first type of the EHRs;

transmitting the modified EHR request to the application programming interface associated with the EHRs, wherein the application programming interface associated with the EHRs responds to EHR requests with a response including data or information extracted from the EHRs;

receiving results from the application programming interface, wherein the results include first information taken from the EHRs;

determining that at least one portion of the first information does not comply with the at least one policy; and in response to determining that the at least one portion of the first information does not comply with the at least one policy, modifying the results to comply with the at least one policy.

8. The system of claim 7, wherein modifying the results comprises retracting the at least one portion of the first information from the results.

9. The system of claim 7, wherein modifying the EHR request to comply with the at least one policy comprises removing second information associated with the patient from the EHR request.

10. One or more non-transitory computer-readable media storing processor-executable instructions that that allows a healthcare organization to comply with laws or regulations regarding electronic health records (EHRs) without significantly modifying an application programming interface associated with the EHRs or an EHR client that is used to access the application programming interface associated with the EHRs, wherein the processor-executable instructions, when executed by one or more processors, cause the one or more processors to perform operations comprising:

receiving, from the EHR client and for transmission to the application programming interface associated with the EHRs, an EHR request that references a first type of the EHRs and a second type of the EHRs, wherein each of the EHRs are associated with a patient;

retrieving at least one policy that identifies the first type of the EHRs as non-compliant;

determining that the EHR request does not comply with the at least one policy, wherein determining that the EHR request does not comply with the at least one policy comprises determining that the patient has not consented to sharing of the EHRs;

in response to determining that the EHR request does not comply with the at least one policy, modifying the EHR request to comply with the at least one policy to generate a modified EHR request that no longer references the first type of the EHRs;

transmitting the modified EHR request to the application programming interface associated with the EHRs, wherein the application programming interface associated with the EHRs responds to EHR requests with a response including data or information extracted from the EHRs;

receiving results from the application programming interface, wherein the results include first information taken from the EHRs;

determining that at least [one portion of the first information does not comply with the at least one policy; and in response to determining that the at least one portion of the first information does not comply with the at least one policy, modifying the results to comply with the at least one policy.

11. The one or more non-transitory computer-readable media of claim 10, wherein modifying the results comprises retracting the at least one portion of the first information from the results.

12. The one or more non-transitory computer-readable media of claim 10, wherein modifying the EHR request to comply with the at least one policy comprises removing second information associated with the patient from the EHR request.

13. The one or more non-transitory computer-readable media of claim 10, wherein the at least one policy relates to an age of the patient.

14. The one or more non-transitory computer-readable media of claim 10, wherein the EHR request is a JavaScript Object Notation (JSON) request.

15. The one or more non-transitory computer-readable media of claim 10, wherein the at least one policy corresponds to one or more federal and state laws.

\* \* \* \* \*